US010038517B2

(12) United States Patent
Kwak et al.

(10) Patent No.: US 10,038,517 B2
(45) Date of Patent: Jul. 31, 2018

(54) METHOD AND APPARATUS FOR GENERATING SECRET KEY IN WIRELESS COMMUNICATION NETWORK

(71) Applicants: ELECTRONICS AND TELECOMMUNICATIONS RESEARCH INSTITUTE, Daejeon (KR); KOREA ADVANCED INSTITUTE OF SCIENCE AND TECHNOLOGY, Daejeon (KR)

(72) Inventors: Byung-Jae Kwak, Daejeon (KR); Jeongseok Ha, Daejeon (KR); Sanghun Im, Goyang-si (KR); Sangseok Yun, Busan (KR)

(73) Assignees: ELECTRONICS AND TELECOMMUNICATIONS RESEARCH INSTITUTE, Daejeon (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 143 days.

(21) Appl. No.: 15/151,927

(22) Filed: May 11, 2016

(65) Prior Publication Data
US 2016/0337122 A1 Nov. 17, 2016

(30) Foreign Application Priority Data

May 11, 2015 (KR) .................. 10-2015-0065133
Sep. 11, 2015 (KR) .................. 10-2015-0129291
May 10, 2016 (KR) .................. 10-2016-0057231

(51) Int. Cl.
*H04K 1/00* (2006.01)
*H04L 9/08* (2006.01)
*H04W 12/04* (2009.01)

(52) U.S. Cl.
CPC ............ *H04K 1/00* (2013.01); *H04L 9/0875* (2013.01); *H04W 12/04* (2013.01); *H04L 2209/80* (2013.01)

(58) Field of Classification Search
CPC ..... H04K 1/00; H04L 9/0875; H04L 2209/80; H04W 12/04
See application file for complete search history.

(56) References Cited

U.S. PATENT DOCUMENTS 8,280,046 B2    10/2012    Rudolf
8,483,392 B2 *   7/2013    Mueck .................. H04L 9/0838
                                                     380/277

(Continued)

FOREIGN PATENT DOCUMENTS

KR    10-2009-0124679 A    12/2009
KR    10-1269502 B1         5/2013

OTHER PUBLICATIONS

Ohira, Takashi, "Secret Key Generation Exploiting Antenna Beam Steering and Wave Propagation Reciprocity", 4 pages. (Year: 2005).*

(Continued)

*Primary Examiner* — Michael J Pyzocha
(74) *Attorney, Agent, or Firm* — LRK Patent Law Firm

(57) ABSTRACT

A method and apparatus for generating a secret key includes: acquiring a random sequence by use of reciprocity of a radio channel; generating the secret key based on the random sequence; and stopping generating the secret key when it is determined that the radio channel is flat based on flatness measured from the radio channel.

20 Claims, 6 Drawing Sheets

(56) References Cited

U.S. PATENT DOCUMENTS

| | | | | |
|---|---|---|---|---|
| 2007/0009098 | A1* | 1/2007 | Tanaka | H04L 1/242 380/30 |
| 2007/0036353 | A1* | 2/2007 | Reznik | H04B 7/0434 380/30 |
| 2007/0177729 | A1* | 8/2007 | Reznik | H04K 1/00 380/44 |
| 2009/0225982 | A1* | 9/2009 | Yener | H04L 63/06 380/44 |
| 2011/0075839 | A1 | 3/2011 | Noh | |
| 2012/0294443 | A1* | 11/2012 | Mathur | H04L 9/0875 380/262 |
| 2013/0142218 | A1* | 6/2013 | Moradi | H04B 1/707 375/135 |
| 2013/0156181 | A1 | 6/2013 | Baek et al. | |
| 2014/0140510 | A1* | 5/2014 | Peng | H04L 9/0875 380/270 |
| 2015/0023503 | A1* | 1/2015 | Baek | H04L 25/0224 380/270 |
| 2015/0048977 | A1* | 2/2015 | Khandani | H01Q 3/46 342/385 |

OTHER PUBLICATIONS

Ye, Chunxuan et al., "Information-theoretically Secret Key Generation for Fading Wireless Channels", pp. 1-32. (Year: 2009).*

Hassan, Amer et al., "Cryptographic Key Agreement for Mobile Radio", Digital Signal Processing 6, pp. 207-212 (1996) Article No. 0023. (Year: 1996).*

Koorapaty, Havish et al., "Secure Information Transmission for Mobile Radio", IEEE Communications Letters, vol. 4, No. 2, Feb. 2000, pp. 52-55. (Year: 2000).*

He, Xiang et al., "The Role of Channel States in Secret Key Generation", 21st Annual IEEE International Symposium on Personal, Indoor and Mobile Radio Communications, pp. 2679-2684. (Year: 2010).*

Aono, Tomoyuki et al., "Wireless Secret Key Generation Exploiting Reactance-Domain Scalar Response of Multipath Fading Channels", IEEE Transactions on Antennas and Propagation, vol. 53, No. 11, Nov. 2005, pp. 3776-3784. (Year: 2005).*

Ren, Kui et al., "Secret Key Generation Exploiting Channel Characteristics in Wireless Communications", IEEE Wireless Communications, Aug. 2011, pp. 6-12. (Year: 2011).*

Liu, Yampei, "Exploiting Channel Diversity in Secret Key Generation from Multipath Fading Randomness", IEEE Transactions on Information Forensics and Security, Oct. 2012, pp. 1-13. (Year: 2012).*

U. Maurer, "Secret key agreement by public discussion from common information," IEEE Tans. Information Theory, vol. 39, pp. 733-742, May 1993.

G. S. Smith, "A direct derivation of a single-antenna reciprocity relation for the time-domain," IEEE Trans. Antennas Propagate., vol. 52, No. 6, pp. 1568-1577, Jun. 2004.

C. H. Bennett, E. Bessette, G. Brassard, L. Salvail and J. Smolin, "Experimental quantum cryptography," Journal of Cryptography, vol. 5, No. 1, pp. 3-28, 1992.

G. Brassard and L. Savail, "Secret-key reconciliation by public discussion," In Advances in cryptology Eurocrypt '93, Lecture Notes in Computer Science, vol. 765, pp. 410-423, Springer-Verlag, New York, 1994.

G. H. Bennett, G. Brassard, C. Crrpeau and U. M. Maurer, "Generalized privacy amplification," IEEE Trans. Information Theory, vol. 41, pp. 1915-1923, Nov. 1995.

C. H. Bennett, G. Brassard and J.-M. Robert, "Privacy amplification by public discussion," SIAM Journal on Computing, vol. 17, pp. 201-229, Apr. 1988.

A. Rukhin et al., "A Statistical Test Suite for Random and Pseudorandom Number Generators for Cryptographic Applications," NIST Special Publication 800-22, National Institute of Standards and Technology, Gaithersburg, MD, Jul. 2000.

Secret key agreement protocol for IEEE 802.15.8 PAC, May 11, 2015.

Text proposal for secret key agreement protocol for IEEE 802.15.8 PAC, Sep 16, 2015.

Text proposal for secret key agreement protocol for IEEE 802.15.8 PAC, Sep 17, 2015.

Secret key agreement protocol for IEEE 802.15.8 PAC, Sep 15, 2015.

Secret key agreement protocol for IEEE 802.15.8 PAC, Sep 17, 2015.

Additional Information for Secret key agreement protocol for IEEE 802.15.8 PAC, Nov 10, 2015.

Supplementary text for secret key agreement protocol for IEEE 802.15.8 PAC, Nov 10, 2015.

BCH Code Construction for Information Reconciliation, Jan 21, 2016.

Informative text on BCH Code Construction for Information Reconciliation, Jan 21, 2016.

* cited by examiner

METHOD AND APPARATUS FOR GENERATING SECRET KEY IN WIRELESS COMMUNICATION NETWORK

CROSS-REFERENCE TO RELATED APPLICATION

This application claims priority to and the benefit of Korean Patent Applications Nos. 10-2015-0065133, 10-2015-0129291 and 10-2016-0057231 filed in the Korean Intellectual Property Office on May 11, 2015, Sep. 11, 2015, and May 10, 2016, respectively, the entire contents of which are incorporated herein by reference.

BACKGROUND OF THE INVENTION

1. Field of the Invention

The present invention relates to a method and apparatus for generating a secret key for secure communication between terminals by using a characteristic of a radio channel of a wireless communication network.

2. Description of the Related Art

In general, in wireless communication, two terminals share an identical secret key to perform secure communication for transmitting and receiving secret messages. A public key cryptography scheme may be used so that the two terminals may share the same secret key. The public key cryptography requires a key management infrastructure, and it may be available only when computing power of the terminal attempting to hack the secret message is limited.

However, a distributed wireless communication system does not have such infrastructure. In addition, it is difficult to apply the conventional public key cryptography scheme that restricts the computing power of the terminal attempting to wiretrap the secured message to the distributed wireless communication system.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment provides an apparatus for generating a secret key by use of a characteristic of a radio channel.

Another exemplary embodiment provides a method for generating a secret key by use of a characteristic of a radio channel.

According to an exemplary embodiment, a method for generating a secret key for a secure communication is provided. The method includes: acquiring a random sequence by use of reciprocity of a radio channel; generating the secret key based on the random sequence; and stopping generating the secret key when it is determined that the radio channel is flat based on flatness measured from the radio channel.

The acquiring of a random sequence may include quantizing a strength indicator of a received signal.

The received signal may be a received probe request, or a received probe response to a transmitted probe request.

The received signal may be a received request to send (RTS) message or a received clear to send (CTS) message in response to a transmitted RTS message.

The acquiring of a random sequence may include quantizing an impulse response to the radio channel.

The quantizing may include quantizing an impulse response of a dominant path from among impulse responses to a multipath when the radio channel is configured with the multipath.

The acquiring of a random sequence may include quantizing a frequency response to the radio channel.

The stopping of generating a secret key may include measuring at least one of a peak-to-average power ratio (PAPR), an inverse peak-to-average power ratio (IPAPR), a spectral flatness measure (SFM), or a coherence bandwidth from a frequency response of the radio channel as the flatness.

The generating of a secret key may include: removing a difference between the random sequence and a random sequence acquired by an opposing terminal of the secure communication; and removing information on randomness that may be leaked when the difference between the two random sequences is removed, from the random sequence.

The removing of information on randomness that may be leaked when the difference between the two random sequences is removed, from the random sequence, may include removing information on randomness that may be leaked when the difference between the two random sequences is removed, from the random sequence, by using a universal hash function.

According to another exemplary embodiment, an apparatus for generating a secret key including: at least one processor; a memory; and a radio frequency unit, wherein the at least one processor performs at least one program stored in the memory to perform acquiring a random sequence by use of reciprocity of a radio channel, generating a secret key for secure communication based on the random sequence, and stopping the generating of a secret key when it is determined that the radio channel is flat based on flatness measured from the radio channel, is provided.

When performing the acquiring of a random sequence, the at least one processor may quantize a strength indicator of a received signal.

The received signal may be a received probe request, or a received probe response to a transmitted probe request.

The received signal may be a received request to send (RTS) message or a received clear to send (CTS) message in response to a transmitted RTS message.

When performing the acquiring of a random sequence, the at least one processor may perform quantizing an impulse response to the radio channel.

When performing the quantizing, the at least one processor may perform quantizing an impulse response of a dominant path from among impulse responses to a multipath when the radio channel is configured with the multipath.

When performing the acquiring of a random sequence, the at least one processor may perform quantizing a frequency response to the radio channel.

When performing the generating of a secret key, the at least one processor performs measuring at least one of a peak-to-average power ratio (PAPR), an inverse peak-to-average power ratio (IPAPR), a spectral flatness measure (SFM), or a coherence bandwidth from a frequency response of the radio channel as the flatness.

When performing the generating of a secret key, the at least one processor may perform: removing a difference between the random sequence and a random sequence acquired by an opposing terminal of the secure communication; and removing information on randomness that may be leaked when the difference between the two random sequences is removed, from the random sequence.

When performing the removing of information on randomness that may be leaked when the difference between the two random sequences is removed, from the random sequence, the at least one processor may perform removing information on randomness that may be leaked when the difference between the two random sequences is removed, from the random sequence, by using a universal hash function.

DETAILED DESCRIPTION OF THE EMBODIMENTS

Figure 1:
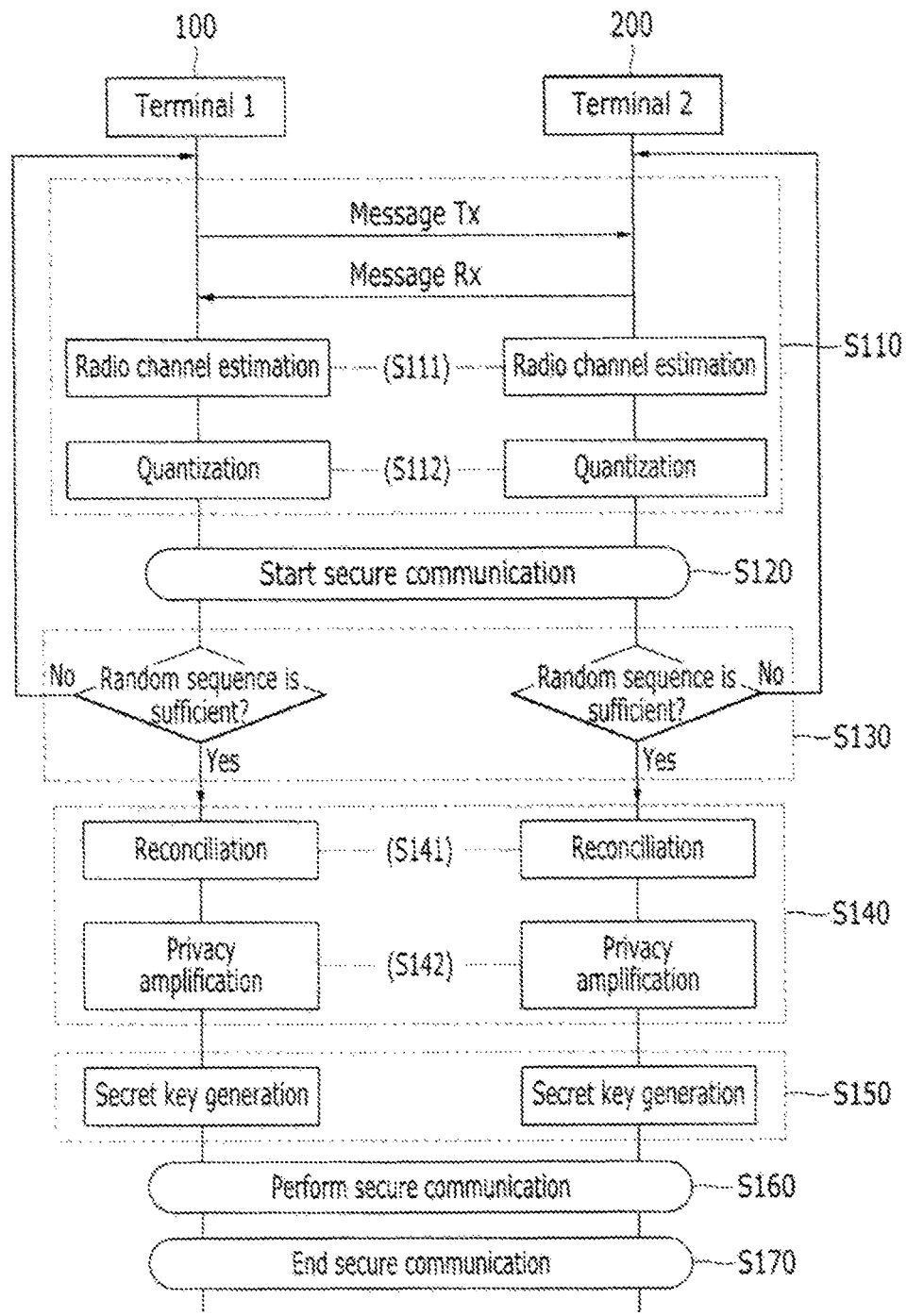
FIG. 1 shows a flowchart for a method for sharing a secret key according to an exemplary embodiment.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

Throughout the specification, a terminal may indicate a mobile station (MS), a mobile terminal (MT), an advanced mobile station (AMS), a high reliability mobile station (HR-MS), a subscriber station (SS), a portable subscriber station (PSS), an access terminal (AT), user equipment (UE), or a machine-type communication (MTC) device, and it may include entire or partial functions of the MT, MS, AMS, HR-MS, SS, PSS, AT, UE, and MTC device.

FIG. 1 shows a flowchart for a method for sharing a secret key according to an exemplary embodiment.

According to an exemplary embodiment, a user of a terminal may turn on or turn off a secure communication function for the terminal. When the secure communication function is in the on state, the user may determine start or end of a secure communication. After the secure communication function is turned on, the terminal may prepare the secure communication before the start of the secure communication. As the preparation of the secure communication, the terminal may save randomness acquired based on insecure communication.

The secret key may be acquired by using the randomness of a radio channel. That is, two terminals performing secure communication use channel reciprocity of the radio channel, and remotely share a secret key without an aid of the key management infrastructure according to a sequential key distillation method to thus transmit and receive the secret message. In the following, referred to FIG. 1, the method for generating a secret key performed when the secure communication function of the terminal is in the on state is described in detail.

Referring to FIG. 1, a first terminal 100 and a second terminal 200 in which the secure communication function is in the on state respectively acquire a random sequence by estimating the radio channel (S110). In this instance, the random sequence acquired by the first terminal and the second terminal include analogous randomness so the step S110 may become a step of sharing randomness.

To acquire sufficient randomness needed for acquiring the secure key, the respective terminals estimate a radio channel by transmitting and receiving a message (S111), and use the estimating result of the radio channel to acquire common randomness. Here, the acquired common randomness may be continuously updated. When the secure communication is started, the respective terminals may use the recently acquired randomness.

For example, a request to send (RTS) message and a clear to send (CTS) message that are transmitted between the terminals prior to data transmission by the terminals may be used to estimate the radio channel. When the RTS message and the CTS message are used for the estimating the radio channel, each terminal may update the estimating result through the RTS message and the CTS message and may acquire the random sequence from the recently updated estimating result when the secure communication is started. In another way, the respective terminals may estimate the radio channel by using a probe request and a probe response.

The terminals acquire the random sequence by quantizing an estimation result of the radio channel (S112).

According to an exemplary embodiment, as the estimation result of the radio channel, the received signal strength indicator (RSSI) of the radio channel, an impulse response, or a frequency response may be used for the quantization.

Figure 2:
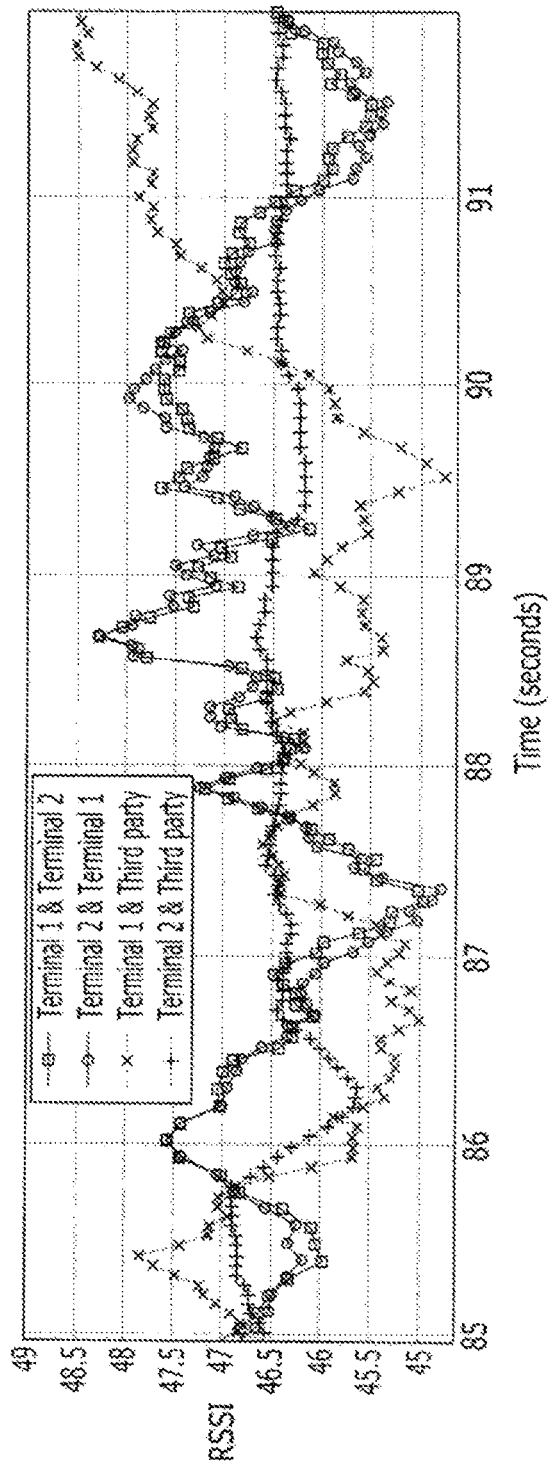
FIG. 2 shows a graph for indicating a received signal strength indicator of a radio channel according to an exemplary embodiment.

FIG. 2 shows a graph for indicating a received signal strength indicator of a radio channel according to an exemplary embodiment.

Because of reciprocity of the channel, the radio channel when the first terminal transmits a signal to the second terminal is very similar to the radio channel when the second terminal transmits a signal to the first terminal. That is, referring to FIG. 2, the RSSI when the first terminal receives the signal from the second terminal is very similar to the RSSI when the second terminal receives the signal from the first terminal. However, the RSSIs of the first terminal, the second terminal, and a third party have different patterns. Therefore, when the point that a characteristic of the radio channel is random and is uniquely determined by positions of a transmitter and a receiver, two users attempting to perform secure communication may generate and share the random sequence by quantizing an observation result of the radio channel.

Figure 3:
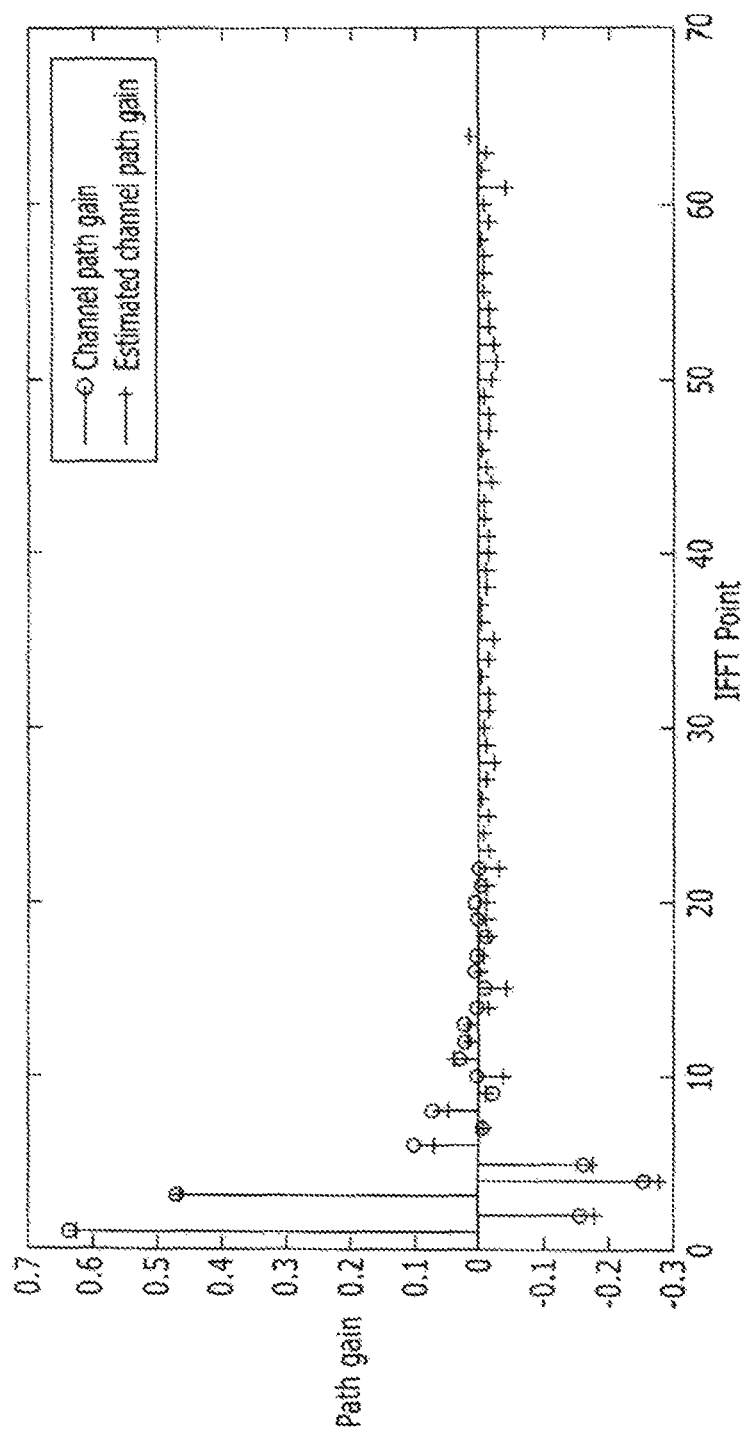
FIG. 3 shows a graph for indicating an impulse response of a radio channel according to an exemplary embodiment.

FIG. 3 shows a graph for indicating an impulse response of a radio channel according to an exemplary embodiment.

In order for the first terminal and the second terminal to share randomness, the impulse response of the radio channel may be used. This is because the impulse response of the radio channel going to the second terminal from the first terminal and the impulse response of the radio channel going to the first terminal from the second terminal have very similar patterns due to reciprocity of the channel.

In this instance, in order for the two users attempting to perform secure communication to share randomness from the impulse response of the radio channel, the random sequence acquired from the impulse response of a path that has relatively high receiving power (i.e., a dominant path)

from among multiple paths configuring the impulse response of the radio channel on a time axis may be used as a common random characteristic.

Figure 4:
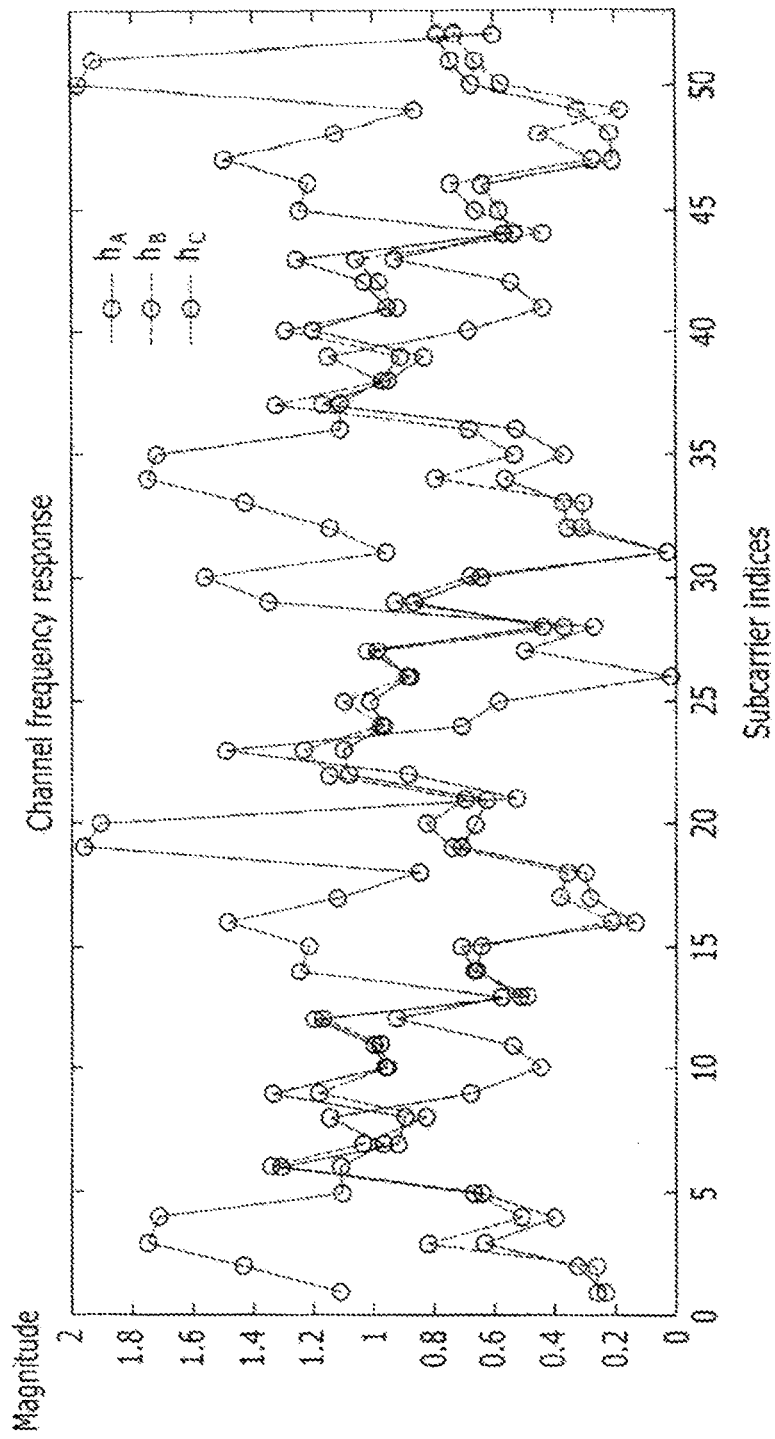
FIG. 4 shows a graph for indicating a frequency response of a radio channel according to an exemplary embodiment.

FIG. 4 shows a graph for indicating a frequency response of a radio channel according to an exemplary embodiment.

In another way, the common random characteristic may be acquired through the frequency response of the radio channel that is equivalent to the impulse response of the radio channel.

When the secure communication is started (S120), the respective terminals determine whether the random sequence for generating the secret key is sufficiently provided (S130). The respective terminals perform the step of sharing randomness again when the acquired randomness from the estimating result is less than the randomness for extracting the secret key. For example, the respective terminals may additionally transmit/receive the RTS message and the CTS message, or the probe request and the probe response, so that the randomness is provided additionally. In this instance, the respective terminals may stop acquiring the randomness when determining that they have obtained sufficient randomness for secure communication.

The respective terminals may determine whether the sufficient randomness is provided based on Equation 1.

$$N_{seq} \le \sum_{i=1}^{i} n_i \qquad \text{(Equation 1)}$$

In the equation 1, $n_i$ is the length of the random sequence acquired from the i-the channel estimation, and $N_{seq}$ is the length of the predetermined random sequence for acquiring the randomness sufficiently. Referring to the equation 1, when the sum of the length of the entire sequence acquired from the channel estimation is longer than the predetermined sequence $N_{seq}$, the respective terminal may determine that the sufficient random sequence is provided.

Referring to FIG. 1 again, the terminals perform post-processing based on the random sequence acquired by quantization (S140) to generate a secret key (S150). Information reconciliation (S141) is to remove a difference existing between the random sequences acquired by the terminals. For example, an error correcting code may be used for the information reconciliation. The first terminal and the second terminal remove information on common randomness that may be leaked (i.e., information that may be acquired by the third party attempting to monitor or wiretap communication) ($N_{leak}$) from the shared randomness ($N_{seq}$) to thus perform privacy amplification (S142). Part of information of the common sequence transmitted/received by the terminals during the information reconciliation process may be wiretapped by the third party, and a secret key unknown to the third party may be extracted from the common sequence by removing the leaked information from the common sequence through the privacy amplification stage. For example, a universal hash function may be used for the privacy amplification.

Afterwards, the terminals perform the secure communication by using the generated secret key (S160). The secure communication may be terminated by the user selection, etc.

When the characteristic of the radio channel estimated for an extraction of randomness is not frequency selective, that is, when the sufficient multipath is not provided for the radio channel environment, a correlation between randomness X shared by the first user and the second user and randomness Y acquired by the third party through wiretapping may become bigger. When a correlation coefficient between a result observed by the first terminal or the second terminal and a result observed by the third party is set to be ρ, an amount of information I(X, Y) on the random sequence shared by the first user and the second user that the third party may know based on the quantization result (e.g., the random sequence acquired through wiretapping) is expressed in Equation 2.

$$I(X, Y) = -\frac{1}{2}\log(1 - \rho^2) \qquad \text{(Equation 2)}$$

The first user and the second user post-process (i.e., f(•)) the shared random sequence to finally acquire the secret key. The amount of information on the final secret key the third party may know based on the randomness acquired by wiretapping has an upper limit according to a data processing inequality, as expressed in Equation 3.

$$I(f(X), Y) \le I(X, Y) = -\frac{1}{2}\log(1 - \rho^2) \qquad \text{(Equation 3)}$$

Figure 5:
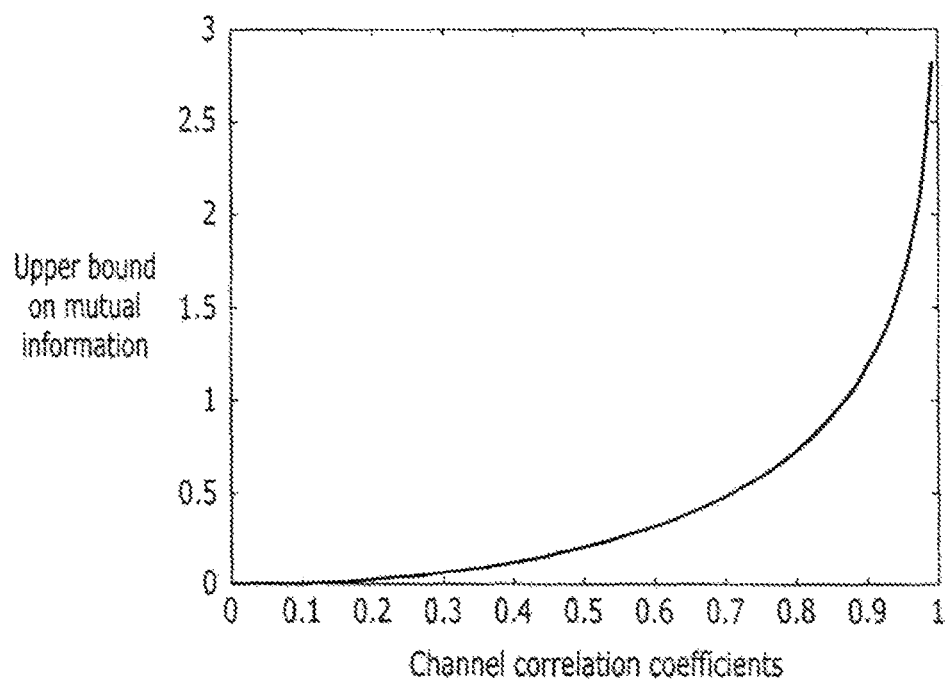
FIG. 5 shows a graph for indicating an upper limit of an amount of information known on a final secret key by a third party according to an exemplary embodiment.

FIG. 5 shows a graph for indicating an upper limit of an amount of information on a final secret key known by a third party according to an exemplary embodiment.

Referring to FIG. 5, when a correlation between a main channel (the channel between the first user and the second user) and a wiretapping channel (the channel between the first user or the second user and the third party) increases, the third party may have a large amount of information on the random sequence shared by the first user and the second user. In general, the correlation between the main channel and the wiretapping channel is not known to the first user and the second user, so in this case, it is difficult to remove the information, which is leaked to the third party in the step of the randomness extraction, through privacy amplification. Therefore, in this case, the third party may know part of the secret key finally acquired by the first user and the second user, and the secret key may not satisfy the security.

In an exemplary embodiment, the case in which security of the shared secret key is determined to be insufficient is selectively detected so existence of a latent danger may be reported to the user. For example, when an insufficient multipath is provided to the radio channel, the terminal may stop the process for generating a secret key for secure communication and may notify the user thereof. In another way, when an insufficient multipath is provided to the radio channel, the terminal may ask the user whether to stop the generation of a secret key for secure communication, and it may be determined whether to continue the secure communication depending on a selection by the user.

The correlation between the main channel and the wiretapping channel may be proportional to flatness of the radio channel and may be inversely proportional to a number of multipath components configuring the radio channel. Therefore, regarding the terminal according to an exemplary embodiment, flatness may be measured from the estimation result of the radio channel, and the generation of a secret key may be stopped when the terminals determine that the radio channel is flat. For example, when the flatness of the radio channel exceeds a predetermined threshold value, the generation of the secret key may be stopped. Table 1 express measures for measuring flatness of the radio channel frequency response.

TABLE 1

| Measures | Descriptions |
|---|---|
| Inverse Peak-to-Average Power Ratio (IPAPR) | $\dfrac{x_{rms}^2}{\lvert x \rvert_{peak}^2}$ $\left(\lvert x \rvert_{peak}^2 = \max\{x_1, x_2, \ldots, x_N\},\ x_{rms}^2 = \sqrt{\dfrac{1}{N}(x_1 + x_2 + \cdots + x_N)}\right),$ (The frequency response at the $x_i$ = i-th subcarrier) |
| Spectral Flatness Measure (SFM) | $\text{Flatness} = \dfrac{\text{mean}_{geometric}}{\text{mean}_{arithmetic}} = \dfrac{\sqrt[N]{\prod_{i=1}^{N} x_i}}{\dfrac{\sum_{i=1}^{N} x_i}{N}} = \dfrac{\exp\left(\sum_{i=1}^{N}(\ln x_i)\right)}{\dfrac{1}{N}\sum_{i=1}^{N} x_i}$ (The frequency response at the $x_i$ = i-th subcarrier) |
| Coherence bandwidth | $BW_{coherence} = \dfrac{1}{\tau_{RMS}}$ $\left(\tau_{RMS} = \sqrt{\dfrac{\int_0^\infty (\tau - \overline{\tau})^2 A_c(\tau)\,d\tau}{\int_0^\infty A_c(\tau)\,d\tau}},\ \overline{\tau} = \dfrac{\int_0^\infty \tau A_c(\tau)\,d\tau}{\int_0^\infty A_c(\tau)\,d\tau},\right.$ $\tau$ = multipath delay, and $A_c(\tau)$ = gain of delay path) |

That is, the terminal according to an exemplary embodiment may measure at least one of PAPR, the IPAPR, the SFM, or the coherence bandwidth as the flatness of the radio channel. When the terminals determine that the radio channel is flat based on the flatness (that is, the radio channel is flat because the sufficient multipath is not provided), it may be determined that the security of the secret key to be generated is low. For example, when the IPAPR is measured as the flatness (that is, the IPAPR is a measurement result for the radio channel), it is determined that the security of the secret key to be generated is low when the IPAPR exceeds the predetermined threshold value. Afterwards, the respective terminals may stop generating a secret key and notify the user that the secure communication may not be performed.

As described above, each terminal may perform the secure communication without an aid of the infrastructure that managing the secret key by generating the secret key by use of the reciprocal characteristic of the radio channel. Further, by using the flatness on the estimated radio channel, the case in which the channel correlation with a third party attempting to wiretap the secure communication increases and the security of the secret key may be lowered may be detected in advance.

Figure 6:
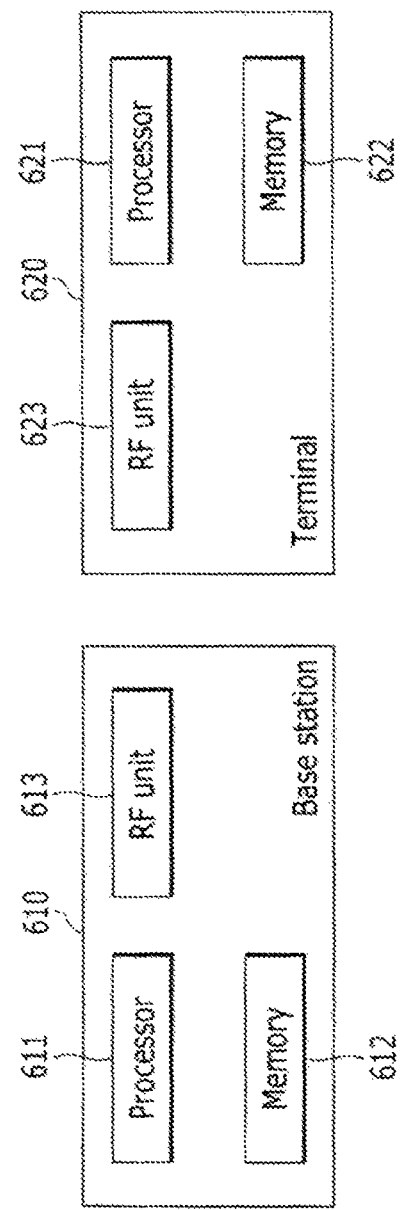
FIG. 6 shows a block diagram of a wireless communication system according to an exemplary embodiment.

FIG. 6 shows a block diagram of a wireless communication system according to an exemplary embodiment.

Referring to FIG. 6, the wireless communication system according to an exemplary embodiment includes a base station 610 and a terminal 620.

The base station 610 includes a processor 611, a memory 612, and a radio frequency (RF) unit 613. The memory 612 may be connected to the processor 611, and may store various kinds of information for driving the processor 611 or at least one program performed by the processor 611. The radio frequency unit 613 may be connected to the processor 611 and may transmit/receive a radio signal. The processor 611 may realize a function, a process, or a method proposed by an exemplary embodiment of the present invention. In this instance, in the wireless communication system according to an exemplary embodiment, a wireless interface protocol layer may be realized by the processor 611. An operation of the base station 610 according to an exemplary embodiment may be realized by the processor 611.

The terminal 620 includes a processor 621, a memory 622, and a radio frequency unit 623. The memory 622 may be connected to the processor 621, and may store various kinds of information for driving the processor 621 or at least one program performed by the processor 621. The radio frequency unit 623 may be connected to the processor 621 and may transmit/receive a radio signal. The processor 621 may realize a function, a process, or a method proposed by an exemplary embodiment of the present invention. In this instance, in the wireless communication system according to an exemplary embodiment, a wireless interface protocol layer may be realized by the processor 621. An operation of the terminal 620 according to an exemplary embodiment may be realized by the processor 621.

In an exemplary embodiment of the present invention, the memory may be provided inside or outside the processor, and the memory may be connected to the processor by using various means known to a person skilled in the art. The memory is a volatile or non-volatile storage medium in various formats, and for example, the memory may include a read-only memory (ROM) or a random access memory (RAM).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for generating a secret key for secure communication between terminals, comprising:
   acquiring a random sequence by use of reciprocity of a radio channel between the terminals;
   generating the secret key based on the random sequence; and
   stopping generating the secret key if a correlation between the radio channel and a wiretapping channel exceeds a predetermined threshold when it is determined that the radio channel is flat based on flatness measured from the radio channel.

2. The method of claim 1, wherein the acquiring of a random sequence includes quantizing a strength indicator of a received signal.

3. The method of claim 2, wherein the received signal is a received probe request, or a received probe response to a transmitted probe request.

4. The method of claim 2, wherein the received signal is a received request to send (RTS) message or a received clear to send (CTS) message in response to a transmitted RTS message.

5. The method of claim 1, wherein the acquiring of a random sequence includes quantizing an impulse response to the radio channel.

6. The method of claim 5, wherein the quantizing includes quantizing an impulse response of a dominant path from among impulse responses to a multipath when the radio channel is configured with the multipath.

7. The method of claim 1, wherein the acquiring of a random sequence includes quantizing a frequency response to the radio channel.

8. The method of claim 1, wherein the stopping of generating the secret key comprises:
   measuring at least one of a peak-to-average power ratio (PAPR), an inverse peak-to-average power ratio (IPAPR), a spectral flatness measure (SFM), or a coherence bandwidth from a frequency response of the radio channel as the flatness; and
   stopping generating the secret key if the flatness exceeds a predetermined value of the IPAPR, the SFM, or the coherence bandwidth.

9. The method of claim 1, wherein the generating of the secret key includes:
   removing a difference between the random sequence and a random sequence acquired by an opposing terminal of the secure communication; and
   removing information on randomness that may be leaked when the difference between the two random sequences is removed, from the random sequence.

10. The method of claim 9, wherein the removing of information on randomness that may be leaked when the difference between the two random sequences is removed, from the random sequence, includes removing information on randomness that may be leaked when the difference between the two random sequences is removed, from the random sequence, by using a universal hash function.

11. An apparatus for generating a secret key for secure communications between terminals, comprising:
   at least one processor;
   a memory; and
   a radio frequency unit,
   wherein the at least one processor performs at least one program stored in the memory to perform
   acquiring a random sequence by use of reciprocity of a radio channel between the terminals,
   generating the secret key for secure communication based on the random sequence, and
   stopping the generating of a secret key if a correlation between the radio channel and a wiretapping channel exceeds a predetermined threshold.

12. The apparatus of claim 11, wherein when performing the acquiring of a random sequence, the at least one processor quantizes a strength indicator of a received signal.

13. The apparatus of claim 12, wherein the received signal is a received probe request, or a received probe response to a transmitted probe request.

14. The apparatus of claim 12, wherein the received signal is a received request to send (RTS) message or a received clear to send (CTS) message in response to a transmitted RTS message.

15. The apparatus of claim 11, wherein when performing the acquiring of a random sequence, the at least one processor performs quantizing an impulse response to the radio channel.

16. The apparatus of claim 15, wherein when performing the quantizing, the at least one processor performs quantizing an impulse response of a dominant path from among impulse responses to a multipath when the radio channel is configured with the multipath.

17. The apparatus of claim 11, wherein when performing the acquiring of a random sequence, the at least one processor performs quantizing a frequency response to the radio channel.

18. The apparatus of claim 17, wherein when performing the stopping of generating the secret key, the at least one processor performs: measuring at least one of a peak-to-average power ratio (PAPR), an inverse peak-to-average power ratio (IPAPR), a spectral flatness measure (SFM), or a coherence bandwidth from a frequency response of the radio channel as the flatness; and
   stopping generating the secret key if the flatness exceeds a predetermined threshold value of the IPAPR, the SFM, or the coherence bandwidth.

19. The apparatus of claim 11, wherein when performing the generating of the secret key, the at least one processor performs:
   removing a difference between the random sequence and a random sequence acquired by an opposing terminal of the secure communication; and
   removing information on randomness that may be leaked when the difference between the two random sequences is removed, from the random sequence.

20. The apparatus of claim 19, wherein when performing the removing of information on randomness that may be leaked when the difference between the two random sequences is removed, from the random sequence, the at least one processor performs removing information on randomness that may be leaked when the difference between the two random sequences is removed, from the random sequence, by using a universal hash function.

* * * * *

UNITED STATES PATENT AND TRADEMARK OFFICE
CERTIFICATE OF CORRECTION

PATENT NO.        : 10,038,517 B2
APPLICATION NO.   : 15/151927
DATED             : July 31, 2018
INVENTOR(S)       : Byung-Jae Kwak et al.

Page 1 of 1

It is certified that error appears in the above-identified patent and that said Letters Patent is hereby corrected as shown below:

In the Specification

On Column 1, Line 14, before the BACKGROUND OF THE INVENTION, please insert the following paragraph:
-- STATEMENT REGARDING KOREAN GOVERNMENT SPONSORED RESEARCH OR DEVELOPMENT
This invention was supported by Institute for Information & communications Technology Planning & Evaluation (IITP) grant funded by the Korea government (MSIT) Grant No. 2018-0-00831, A Study on Physical Layer Security for Heterogeneous Wireless Network. --

Signed and Sealed this
Thirty-first Day of December, 2019

Andrei Iancu
*Director of the United States Patent and Trademark Office*